US008395977B1

(12) United States Patent
Temmerman et al.

(10) Patent No.: US 8,395,977 B1
(45) Date of Patent: Mar. 12, 2013

(54) METHOD AND APPARATUS FOR CALIBRATING WRITE STRATEGY

(75) Inventors: Jents Temmerman, Hove (BE); Gary Christopher Maul, Limburg (NL)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/173,810

(22) Filed: Jun. 30, 2011

Related U.S. Application Data (60) Provisional application No. 61/360,366, filed on Jun. 30, 2010.

(51) Int. Cl.
*G11B 7/00* (2006.01)
(52) U.S. Cl. ..................... 369/47.53; 369/116
(58) Field of Classification Search .................. 369/116, 369/47.1, 47.27, 47.51, 47.52, 47.53, 120, 369/275.3, 47.28
See application file for complete search history.

(56) References Cited

U.S. PATENT DOCUMENTS

| 5,513,166 | A | 4/1996 | Tokumitsu et al. |
|---|---|---|---|
| 5,574,706 | A | 11/1996 | Verboom et al. |
| 5,969,649 | A | 10/1999 | Ashley et al. |
| 6,345,033 | B1 | 2/2002 | Hayashi |
| 6,891,565 | B1 | 5/2005 | Dieterich |
| 6,975,572 | B2 | 12/2005 | Matsumoto |
| 7,301,870 | B2 * | 11/2007 | Masui .................. 369/47.53 |
| 7,436,745 | B2 | 10/2008 | Kim |
| 7,570,549 | B2 | 8/2009 | Van Endert et al. |
| 7,623,420 | B2 | 11/2009 | Bahng |
| 7,639,577 | B2 | 12/2009 | Roh |
| 2003/0115534 | A1 | 6/2003 | Kojima et al. |
| 2004/0008599 | A1 | 1/2004 | Hogan |
| 2004/0264330 | A1 | 12/2004 | Roh |
| 2005/0058034 | A1 | 3/2005 | Ando et al. |
| 2005/0068871 | A1 | 3/2005 | Weirauch |
| 2006/0067185 | A1 | 3/2006 | Ueki et al. |
| 2007/0030783 | A1 | 2/2007 | Van Endert et al. |
| 2007/0165501 | A1 | 7/2007 | Iida et al. |
| 2007/0171805 | A1 | 7/2007 | Shigeta et al. |
| 2008/0106985 | A1 | 5/2008 | Hasebe et al. |
| 2008/0192598 | A1 | 8/2008 | Jayaraman et al. |
| 2008/0205210 | A1 | 8/2008 | Van Endert et al. |
| 2009/0122680 | A1 | 5/2009 | Van Endert et al. |
| 2009/0262616 | A1 | 10/2009 | Tang et al. |

FOREIGN PATENT DOCUMENTS

| JP | A-05-028495 | 2/1993 |
|---|---|---|
| JP | A-06-309669 | 11/1994 |
| JP | A-2001-101807 | 4/2001 |
| JP | A-2003-151210 | 5/2003 |

OTHER PUBLICATIONS

"Write-Recalibration in Single- and Dual-Headed Optical Disk Drives," IBM Tech. Disclosure Bulletin, vol. 34, No. 9, Feb. 1992, Armonk, NY, pp. 70-71.
"Taguchi Design Tutorial," Design-Ease 6 User's Guide, http://www.statease.com/e6ug/DE05-Taguchi.pdf, Rev. Jan. 10, 2001, pp. 5-1 to 5-9.
"Running Optimum Power Control: Data Integrity in CD-Recording," Optical Storage Technology Association, Jan. 7, 1998.

(Continued)

*Primary Examiner* — Nabil Hindi (57) ABSTRACT

Aspects of the disclosure provide a method for power calibration. The method includes writing, using a power configuration, a second pattern over a first pattern on a rewritable storage medium. The first pattern includes at least a first symbol and a second symbol while the second pattern does not include the second symbol. Thus, the second symbol in the first pattern is erased according to the power configuration. Then, the method includes reading the rewritable storage medium to measure remaining amplitude of the second symbol in the first pattern.

20 Claims, 9 Drawing Sheets

OTHER PUBLICATIONS

"Taguchi Approach to Design of Experiments," American Society of Quality (ASQ).

"Write Strategies for High Performance DVD+R/RW," Phillips, pp. 1-5.

"Data Interchange on 120mm and 80mm Optical Disk using +R Format-Capacity: 4.7 and 1.46 Gbytes per Side," Standard ECMA-349, 3rd Edition, Dec. 2005.

Korean Office Action dated Jun. 21, 2010; Korean Patent Application No. 10-2008-7022833; Korean Intellectual Property Office, Republic of Korea.

Foland, William R. Jr., "Circuits, Architectures, Apparatuses, Systems, Algorithms and Methods and Software for Timing Calibration for Optical Disc Recording," International Search Report in International Application No. PCT/US2009/030878, dated Feb. 26, 2009; 2 pages, International Searching Authority/United States Patent and Trademark Office, Alexandria, Virginia, US.

Foland, William R. Jr., "Circuits, Architectures, Apparatuses, Systems, Algorithms and Methods and Software for Timing Calibration for Optical Disc Recording," Written Opinion of the international Searching Authority in International Application No. PCT/US2009/030878, dated Feb. 26, 2009, 5 pages, International Searching Authority/United States Patent and Trademark Office, Alexandria, Virginia, US.

* cited by examiner

METHOD AND APPARATUS FOR CALIBRATING WRITE STRATEGY

INCORPORATION BY REFERENCE

This application claims the benefit of U.S. Provisional Application No. 61/360,366, entitled "Optimize Epsilon1 Write Strategy Parameters in RW Discs" filed on Jun. 30, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, rewritable media can be made of a material capable of phase change to store information. In order to change phase, energy is required. In an example, a laser beam is used to provide energy for the phase change. The power of the laser beam influences storage quality, and affects rewritability of the material.

SUMMARY

Aspects of the disclosure provide a method for power calibration. The method includes writing, using a power configuration, a second pattern over a first pattern on a rewritable storage medium. The first pattern includes at least a first symbol and a second symbol, while the second pattern does not include the second symbol. Thus, the second symbol in the first pattern is erased according to the power configuration. Then, the method includes reading the rewritable storage medium to measure remaining amplitude of the second symbol in the first pattern.

In an embodiment, the method includes writing on the rewritable storage medium the first pattern. In an example, the method includes writing on the rewritable storage medium a plurality of the first patterns, writing, according to the power configuration, a plurality of the second patterns over the plurality of the first patterns on the rewritable storage medium, reading the rewritable storage medium to measure remaining amplitudes of the second symbols, averaging the remaining amplitudes, associating the average with the power configuration.

According to an aspect of the disclosure, the method includes writing on the rewritable storage medium at least a first plurality of the first patterns and a second plurality of the first patterns, writing, according to a first power configuration, a first plurality of the second patterns over the first plurality of the first patterns on the rewritable storage medium, writing, according to a second power configuration, a second plurality of the second patterns over the second plurality of the first patterns on the rewritable storage medium, and reading the rewritable storage medium to measure first remaining amplitudes of the second symbols in the first plurality of the first patterns, and second remaining amplitudes of the second symbols in the second plurality of the first patterns. Further, the method includes determining an optimum power configuration for the rewritable storage medium based on the first remaining amplitudes in association with the first power configuration and the second remaining amplitudes in association with the second power configuration.

To write, according to the power configuration, the second pattern over the first pattern on the rewritable storage medium, in an example, the method includes writing, according to a write power and an erase power, the second pattern over the first pattern on the rewritable storage medium. In another example, the method includes writing, according to a write power and a ratio of an erase power to the write power, the second pattern over the first pattern on the rewritable storage medium.

In an embodiment, the method further includes storing a pattern that superimposes an instruction for measuring the remaining amplitude of the second symbol with one of the first pattern and the second pattern, and decoding the pattern to perform the instruction.

Aspects of the disclosure provide an apparatus. The apparatus includes a read and write unit and a power calibration controller. The read and write unit is configured to write, according to a power configuration, a second pattern over a first pattern on the rewritable storage medium. The first pattern includes at least a first symbol and a second symbol, while the second pattern does not include the second symbol. Thus, the second symbol is erased according to the power configuration. The read and write unit is further configured to read the rewritable storage medium to measure remaining amplitude of the second symbol. The power calibration controller is configured to determine an optimum power configuration for the rewritable storage medium based on the remaining amplitude in association with the power configuration.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
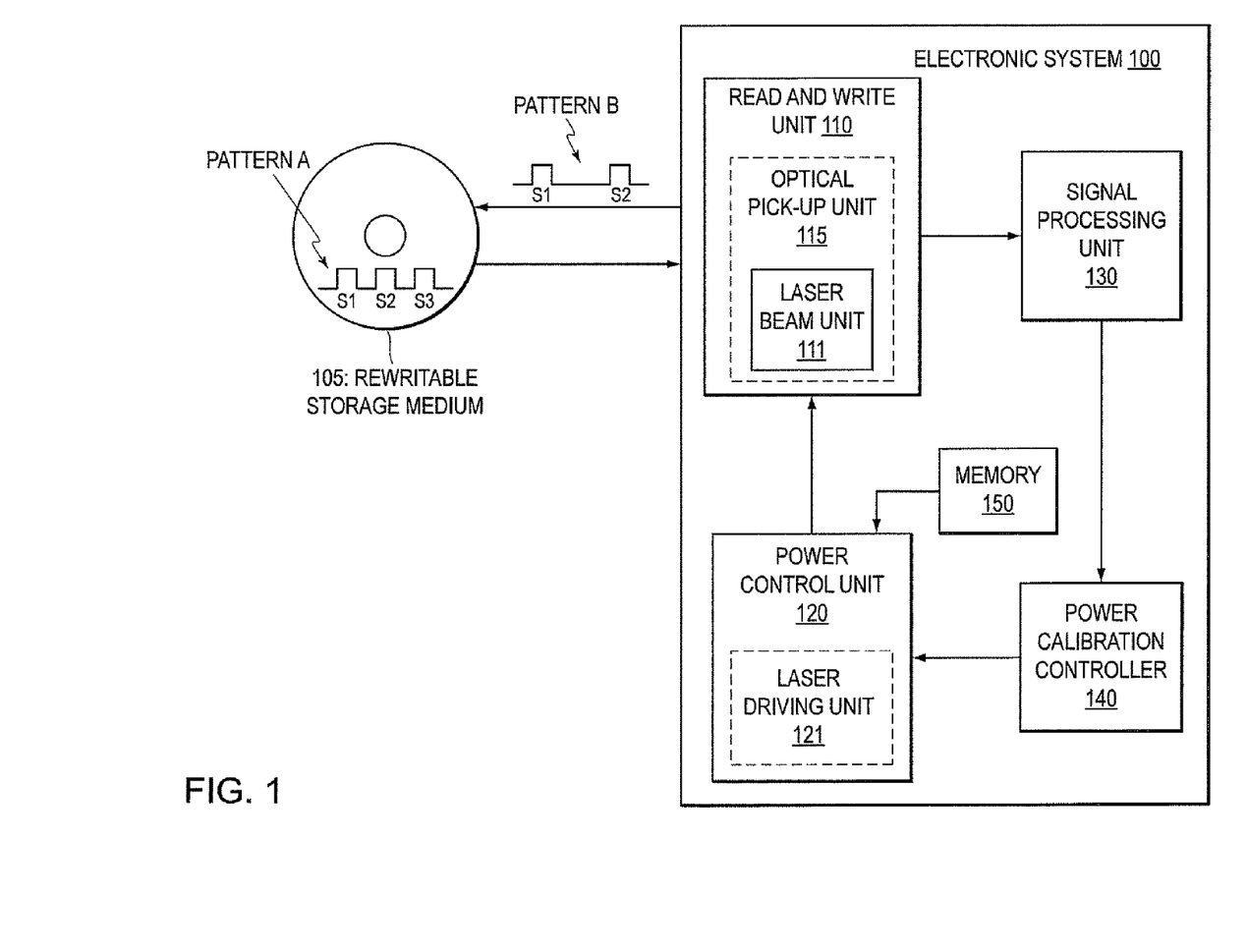
FIG. 1 shows a block diagram of an electronic system 100 according to an embodiment of the disclosure.

FIG. 1 shows a block diagram of an electronic system 100 according to an embodiment of the disclosure. The electronic system 100 is configured to calibrate an optimum power configuration for recording data on a rewritable storage medium 105 to ensure recording quality, and to increase a number of overwrites (DOW) for the rewritable storage medium 105.

In the FIG. 1 example, the electronic system 100 includes a read and write unit 110 that can be configured to record data onto the rewritable storage medium 105 and can be configured to receive a signal corresponding to data recorded on the rewritable storage medium 105. Further, the electronic system 100 includes a power control unit 120 configured to control the power used for read and write, a signal processing unit 130 configured to process the received signal, and a power calibration controller 140 configured to control a power calibration process to characterize power configurations, and determine an optimum power configuration for recording data onto the rewritable storage medium 105. These elements are coupled together as shown in FIG. 1.

It is noted that the rewritable storage medium 105 can be any suitable storage medium that includes a material capable of phase change to store information. In an example, the rewritable storage medium 105 is a rewritable optical disc 105 that includes a physical layer of a material that is able to change phase. For example, the material has a crystalline phase and an amorphous phase. In the crystalline phase, the material has a crystalline structure; and in the amorphous phase, the material has an amorphous structure. According to an embodiment of the disclosure, the material has different optical characteristics, such as different reflectivity values, in the different phases. For example, when the material at a location is in the amorphous phase, the location has a relatively small reflectivity, and when the material at the location is in the crystalline phase, the location has a relatively large reflectivity. Thus, the crystalline phase and the amorphous phase can be used to store, for example, binary "0" and binary "1", respectively.

Generally, energy is required to switch between the crystalline phase and the amorphous phase. In an example, the read and write unit 110 includes an optical pick up unit 115. The optical pick up unit 115 includes a laser beam unit 111 for providing energy to the rewritable optical disc 105 during read and write. The power control unit 120 includes a laser-driving unit 121 configured to drive the laser beam unit 111 according to a power configuration. It is noted that the laser driving unit 121 also drives the laser beam unit 111 according to the data to be recorded. The power configuration includes various parameters that specify the energy delivered by the laser beam, such as a write power, an erase power, and the like.

To record data onto the rewritable optical disc 105, in an example, the laser beam unit 111 directs a laser beam to a location of the rewritable optical disc 105. The laser beam suitably heats the location according to the power configuration and the data for recording.

In an example, to write binary "1", the laser beam is driven by a write pulse of a write power to deliver energy to a location on the rewritable optical disc 105. The laser beam heats the location to a temperature above a melting point of the material that is capable of phase change, and then cools the location down quickly, for example, by dropping the write power to zero. Thus, the material does not have enough time to form crystalline structure, and becomes amorphous structure. To write binary "0", the laser beam is driven continuously by an erase power to deliver energy to a location on the rewritable optical disc 105. The laser beam heats the location to a temperature above the melting point, and then, cools the location down relatively slowly as the laser beam moves away from the location. Thus, the material at the location has enough time to form the crystalline structure.

To read the stored data, in an example, a low power laser beam is driven to a location on the rewritable optical disc, and the laser beam is reflected based on the reflectivity at the location. The optical pick-up unit 115 includes an optical detector to detect the intensity of the reflected laser beam. Based on the intensity, the data stored at the location can be determined.

According to an embodiment of the disclosure, power configuration can affect write quality and the number of overwrites (DOW). In an example, a power configuration uses $\epsilon$ to represent a ratio between the erase power and the write power. When $\epsilon$ is relatively small, the erase power is relatively small. The laser beam of the erase power may not sufficiently convert the material from the amorphous phase to the crystalline phase, and may deteriorate the recording quality. On the other hand, when $\epsilon$ is relatively large, the erase power is relatively large. The laser beam of the relatively larger erase power may affect the number of overwrites.

In addition, according to an embodiment of the disclosure, rewritable optical disc 105 may have different properties due to, for example, different materials, different combination of layers, different manufacturing processes, process variation, and the like. In addition, the electronic system 100 may have different properties due to, for example, different manufactures, process variation, and the like. Thus, the optimum power configuration for a combination of an electronic system 100 and a rewritable optical disc 105 may not be the optimum power configuration for a different combination of another electronic system 100 and/or another rewritable optical disc 105.

According to an embodiment, the electronic system 100 is configured to characterize a power configuration by overwriting a first pattern (pattern A) on the rewritable optical disc 105 with a second pattern (pattern B) using the power configuration. The overwriting causes a symbol in the first pattern to be erased. The electronic system 100 then measures remaining amplitude of the symbol and associates the remaining amplitude with the power configuration. Based on characterizations of multiple power configurations, the electronic system 100 determines an optimum power configuration for the rewritable optical disc 105, and uses the optimum power configuration to record data onto the rewritable optical disc 105.

During operation, for example, pattern A is recorded on a portion of the rewritable optical disc 105, such as a portion of a reading track assigned for power calibration. It is noted that pattern A can be recorded by the electronic system 100 or can be pre-recorded, for example, by disc manufacturer. In the FIG. 1 example, pattern A includes a first symbol S1, a second symbol S2 and a third symbol S3. It is noted that a plurality of pattern A can be recorded in the portion for power calibration. It is also noted that other patterns, such as patterns having different symbol widths, different symbol spaces, and the like, can be recorded in the portion for power calibration.

Then, the power calibration controller 140 provides a power configuration for characterizing the laser-driving unit 121. In addition, a memory 150 that stores patterns provides pattern B to the laser-driving unit 121. In the FIG. 1 example, pattern B does not include the second symbol S2. The laser driving unit 121 controls the laser beam unit 111 according to the power configuration and pattern B to overwrite pattern A with pattern B. The overwriting causes the second symbol S2 to be erased using the power configuration. In an embodiment, the power calibration controller 140 provides the same power configuration to the laser drive unit 121 to overwrite a plurality of pattern A with a plurality of pattern B. In another embodiment, the laser drive unit 121 uses the same power configuration for patterns with different symbol widths and symbol spaces.

Then, the optical pick-up unit 115 reads the rewritable optical disc 105. Specifically, the optical pick-up unit 115 generates an electrical signal according to, for example, reflectivity values on the recording track of the rewritable optical disc 105.

The signal-processing unit 130 processes the electrical signal and measures remaining amplitude of the second symbol S2. In an embodiment, the signal-processing unit 130 is configured to store a reference pattern and process the electrical signal based on the reference pattern. In an example, the signal processing unit 130 is configured to store pattern A, and measure an amplitude of the electrical signal at a time when the electrical signal corresponds to a center position of the second symbol S2 in pattern A. For example, the signal processing unit 130 includes circuits that are configured to measure the electrical signal each time the electrical signal corresponds to a symbol having a symbol width of four bit intervals, and the second symbol 82 in pattern A has four bit intervals. Thus, the signal-processing unit 130 measures the electrical signal at a time when the electrical signal corresponds to the second symbol S2.

In another example, the reference pattern is configured to superimpose an instruction, such as a measuring instruction, with a data pattern, such as pattern A. The reference pattern violates a pattern rule, such as a run length limited (RLL) constraint, and causes the signal-processing unit 130 to recognize the violation and separate the data pattern and the instruction. The signal-processing unit 130 then processes the electrical signal according to the instruction. One way to encode the instructions may be to map the number of violation in a sequence to a particular instruction. For example, an instruction set has five instructions that are identified as one to five. To encode the second instruction, for example, a sequence of the pattern, such as a frame and the like, is configured to have two violations. A person skilled in the art will be able to implement a variety of other encoding techniques based on this disclosure.

Further, the power calibration controller 140 associates the measured remaining amplitude with the power configuration. In another embodiment, the power calibration controller 140 associates the remaining amplitude with a combination of the power configuration, symbol widths, and symbol spaces.

Further, in an embodiment, the power calibration controller 140 provides different power configurations to the laser drive unit 121. The laser drive unit 121 writes pattern B over pattern A according to the different power configurations. The optical pick-up unit 115 generates an electrical signal according to reflectivity characteristics on the recording track of the rewritable optical disc 105. The signal processing unit 130 processes the electrical signal and measures remaining amplitudes of the second symbols S2 for different power configurations. Then, the power calibration controller 140 associates remaining amplitudes with the power configurations, and determines an optimum power configuration based on the characterizations.

It is noted that the electronic system 100 can include other suitable components (not shown), such as processor, user input module, audio/video module, and the like.

Figure 2A:
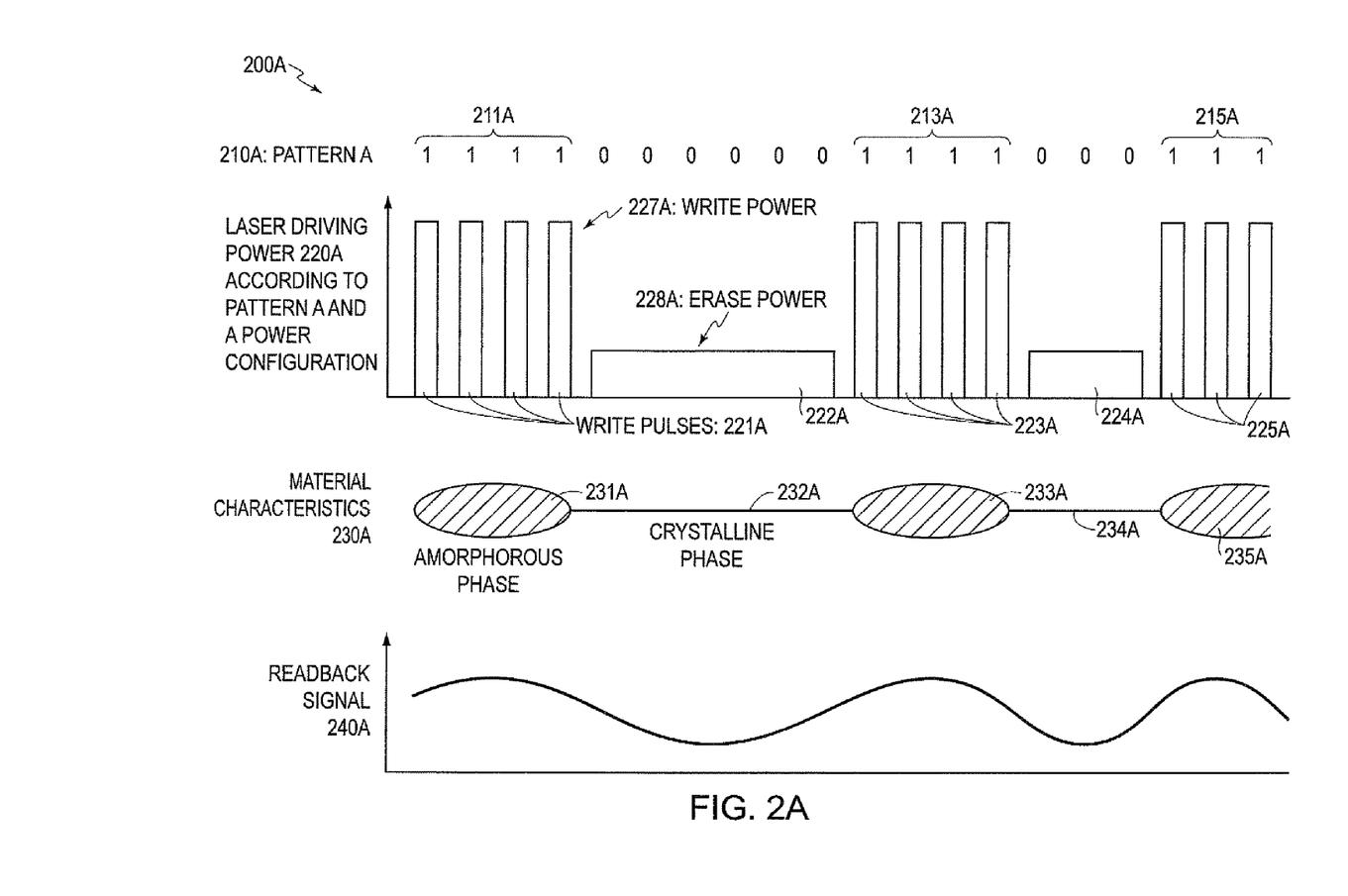
FIGS. 2A and 2B show an example of characterizing a power configuration according to an embodiment of the disclosure.
Figure 2B:
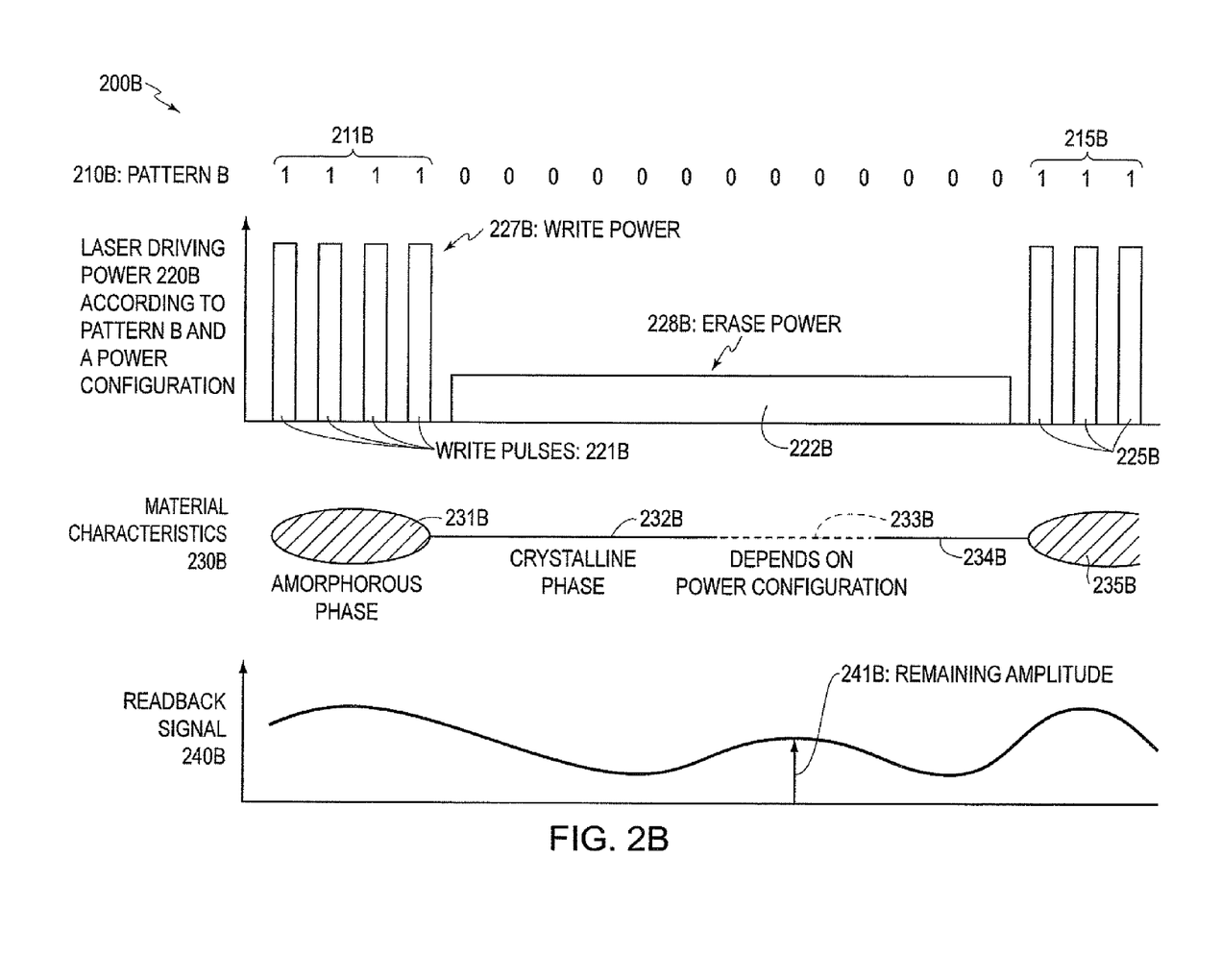

FIGS. 2A and 2B show an example for characterizing a power configuration according to an embodiment of the disclosure. FIG. 2A shows plot 200A based on a first write stage. The plot 200A includes pattern A (210A) for the first write stage, laser driving power 220A in the first write stage, material characteristics 230A on a recording track after the first write stage, and a read-back signal 240A after the first write stage.

In the FIG. 2A example, pattern A is a binary stream including symbols formed by consecutive binary ones. For example, pattern A includes a first symbol 211A of four consecutive binary ones, a second symbol 213A of four consecutive binary ones, and a third symbol 215A of three consecutive binary ones. The first symbol 211A and the second symbol 213A are spaced by six consecutive binary zeros, and the second symbol 213A and the third symbol 215A are spaced by three consecutive binary zeros.

The laser driving power 220A is generated, for example, by the laser driving unit 121, based on the power configuration. For example, in response to a binary one, the laser driving power 220A includes a pulse for generating a laser beam pulse. The laser beam pulse can raise a temperature at a location of the rewritable optical disc 105 to above the melting point of the material, and then quickly drop the temperature to force the material at the location to form amorphous structure. Further, in response to a binary zero, the laser driving power 220A includes a continuous power level for generating a continuous laser beam. When the continuous later beam sweeps a location of the recording track on the rewritable optical disc 105, the continuous laser beam can raise the temperature at the location to a temperature above the melting point of the material, and slowly cool the temperature down to enable the material at the location to form the crystalline structure. In an example, the power configuration includes a write power for specifying power amplitude of pulses, and an erase power for specifying power amplitude of the continuous power level.

The material characteristics 230A shows phases of the material on the recording track of the rewritable optical disc 105 due to the laser driving power 220A. The material at location 231A, 233A and 235A are in the amorphous phase due to the write pulses. The material at location 232A and 234A are in the crystalline phase due to the continuous power level. The read-back signal 240A shows an electrical signal generated corresponding to the recording track of the rewritable optical disc 105 after the first write stage.

FIG. 2B shows plot 200B of a second write stage. The plot 200B includes pattern B (210B), laser driving power 220B, material characteristics 230B after the second write stage, and a read-back signal 240B after the second write stage.

In the FIG. 2B example, pattern B is identical to pattern A except for the second symbol being left out. The laser driving power 220B is generated, for example, by the laser driving unit 121, based on pattern B and the power configuration. The material characteristics 230B shows phases of the material on the recording track of the rewritable optical disc 105 due to the laser driving power 220B. The material at location 231B and 235B are in the amorphous phase due to the write pulses. The material at location 232B and 234B are in the crystalline phase due to the continuous power level. The material at location 233B depends on the power configuration. For example, when the erase power is relatively low, a relatively large portion of the material at location 233B is still in the amorphous phase. When the erase power is relatively high, majority of the material at location 233B is in the crystalline phase. The read-back signal 240B shows an electrical signal generated corresponding to the recording track of the rewritable optical disc 105 after the second write stage. Due to a portion of the material at location 233B is still in the amorphous phase, the read-back signal has a remaining amplitude 241B of the second symbol.

Figure 3:
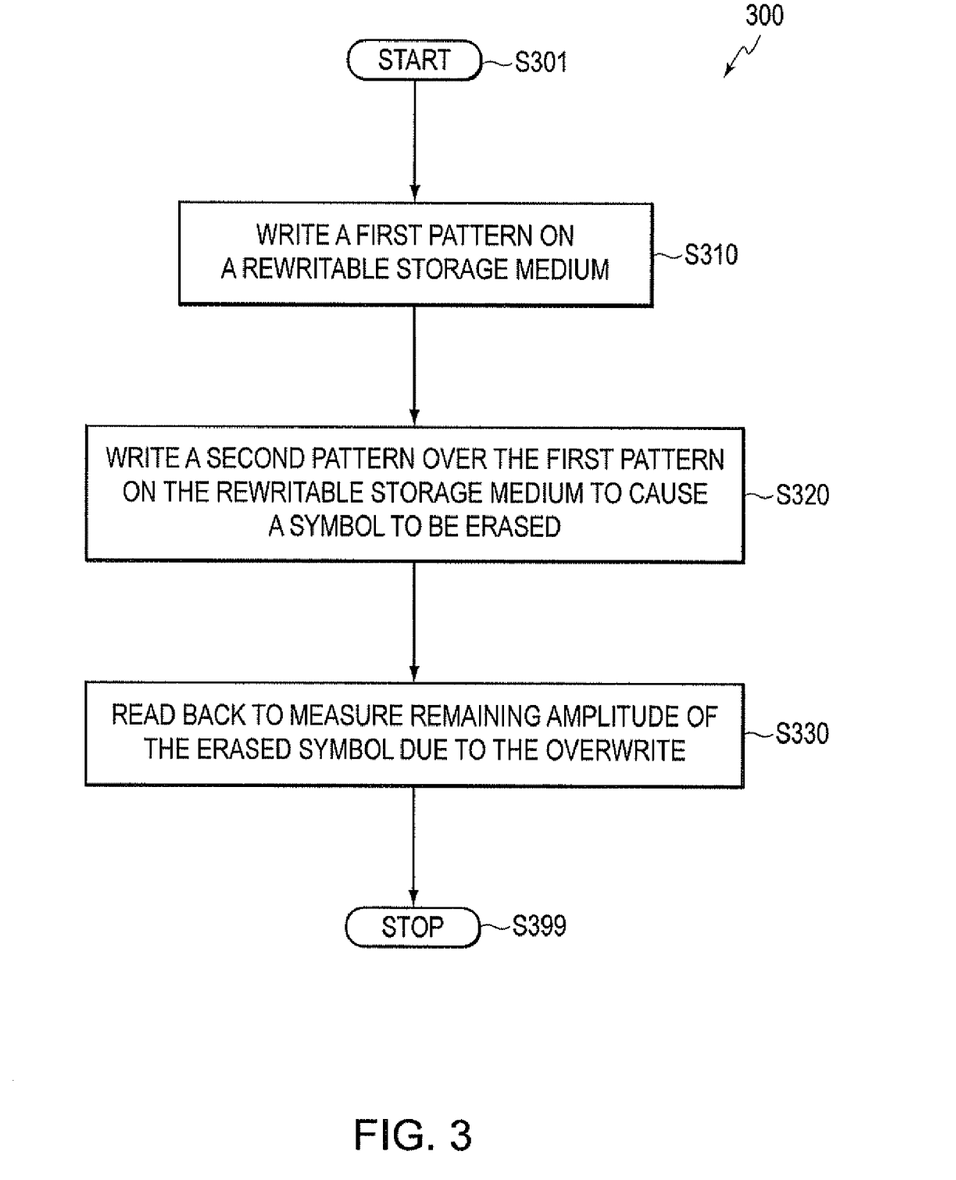
FIG. 3 shows a flow chart outlining a process example 300 according to an embodiment of the disclosure.

FIG. 3 shows a flow chart outlining a process example 300 according to an embodiment of the disclosure. The process is executed by an electronic system, such as the electronic system 100, to characterize a power configuration for writing on a rewritable storage medium, such as the rewritable optical disc 105. The process starts at S301, and proceeds to S310.

At S310, the electronic system writes a first pattern on the rewritable storage medium. The first pattern includes at least a first symbol and a second symbol.

At S320, the electronic system writes a second pattern over the first pattern on the rewritable storage medium according to the power configuration. The second pattern does not include the second symbol. Thus, the second symbol is erased from the rewritable storage medium according to the power configuration.

At S330, the electronic system reads back the rewritable storage medium to measure remaining amplitude of the erased second symbol due to the over-write. The remaining amplitude is associated with the power configuration. The process proceeds to S399 and terminates.

Figure 4:
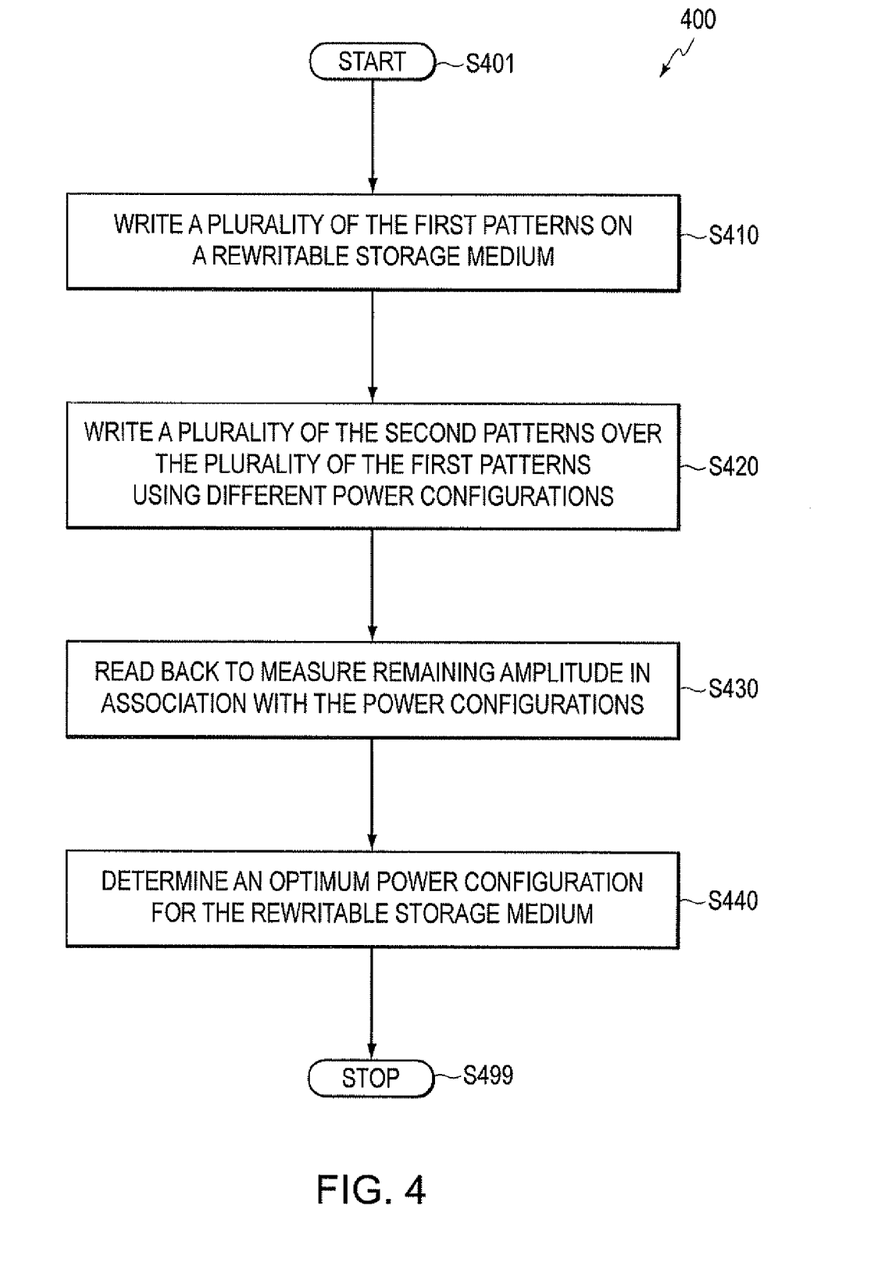
FIG. 4 shows a flow chart outlining a process example 400 for power calibration according to an embodiment of the disclosure.

FIG. 4 shows a flow chart outlining a process example 400 for power calibration according to an embodiment of the disclosure. The process is executed by an electronic system, such as the electronic system 100, to calibrate an optimum power configuration for writing on a rewritable storage medium. The process starts at S401, and proceeds to S410.

At S410, the electronic system writes a plurality of the first patterns on the rewritable storage medium. The first pattern includes at least a first symbol and a second symbol.

At S420, the electronic system writes a plurality of second patterns over the plurality of the first patterns on the rewritable storage medium using different power configurations. The second pattern does not include the second symbol. Thus, second symbols are erased from the rewritable storage medium according to the different power configurations.

At S430, the electronic system reads back the rewritable storage medium to measure remaining amplitudes of the erased second symbols in the plurality of second patterns due to the over-write. The remaining amplitudes are associated with the respective power configurations.

At S440, the electronic system determines the optimum power configuration based on the remaining amplitudes in association with the power configurations. The process proceeds to S399 and terminates.

Figure 5A:
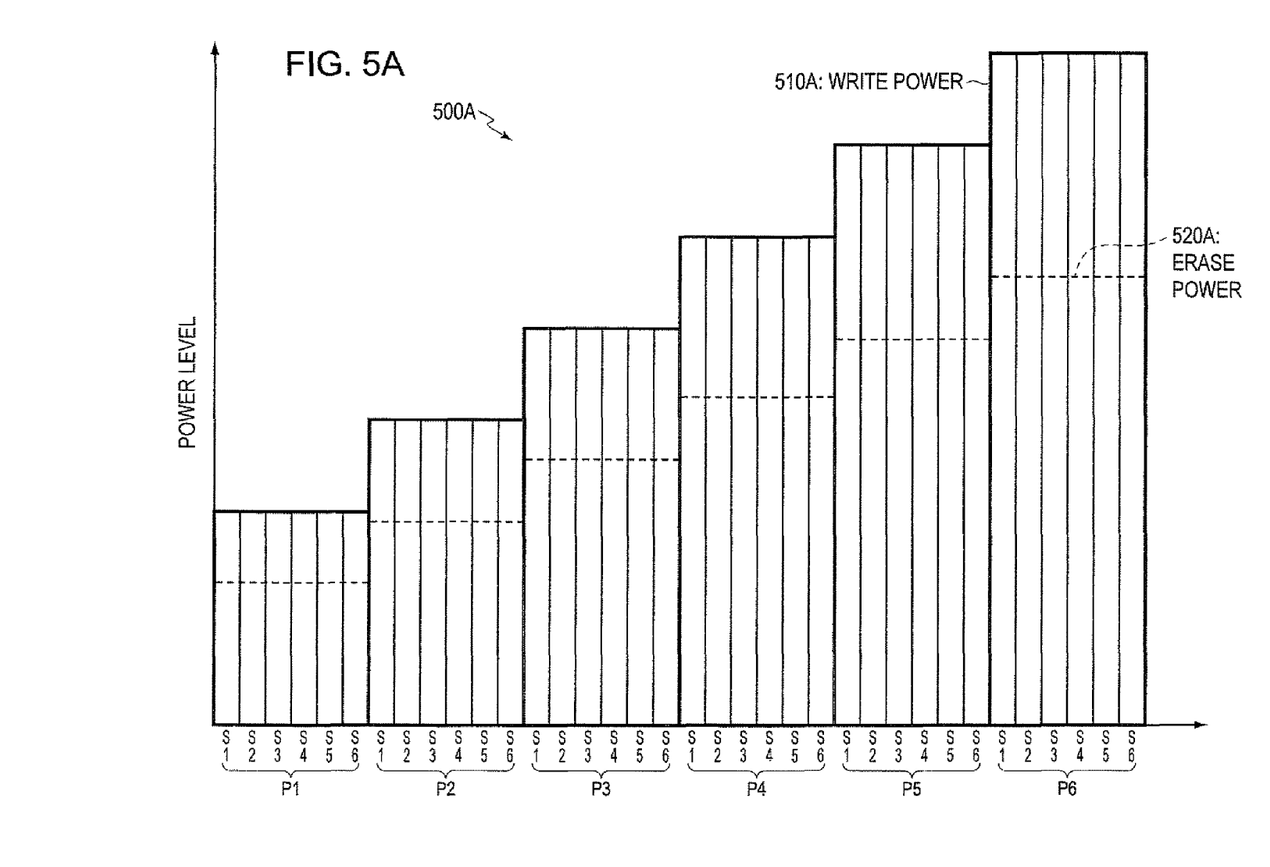
FIGS. 5A-5C show an example of power calibration according to an embodiment of the disclosure.
Figure 5B:
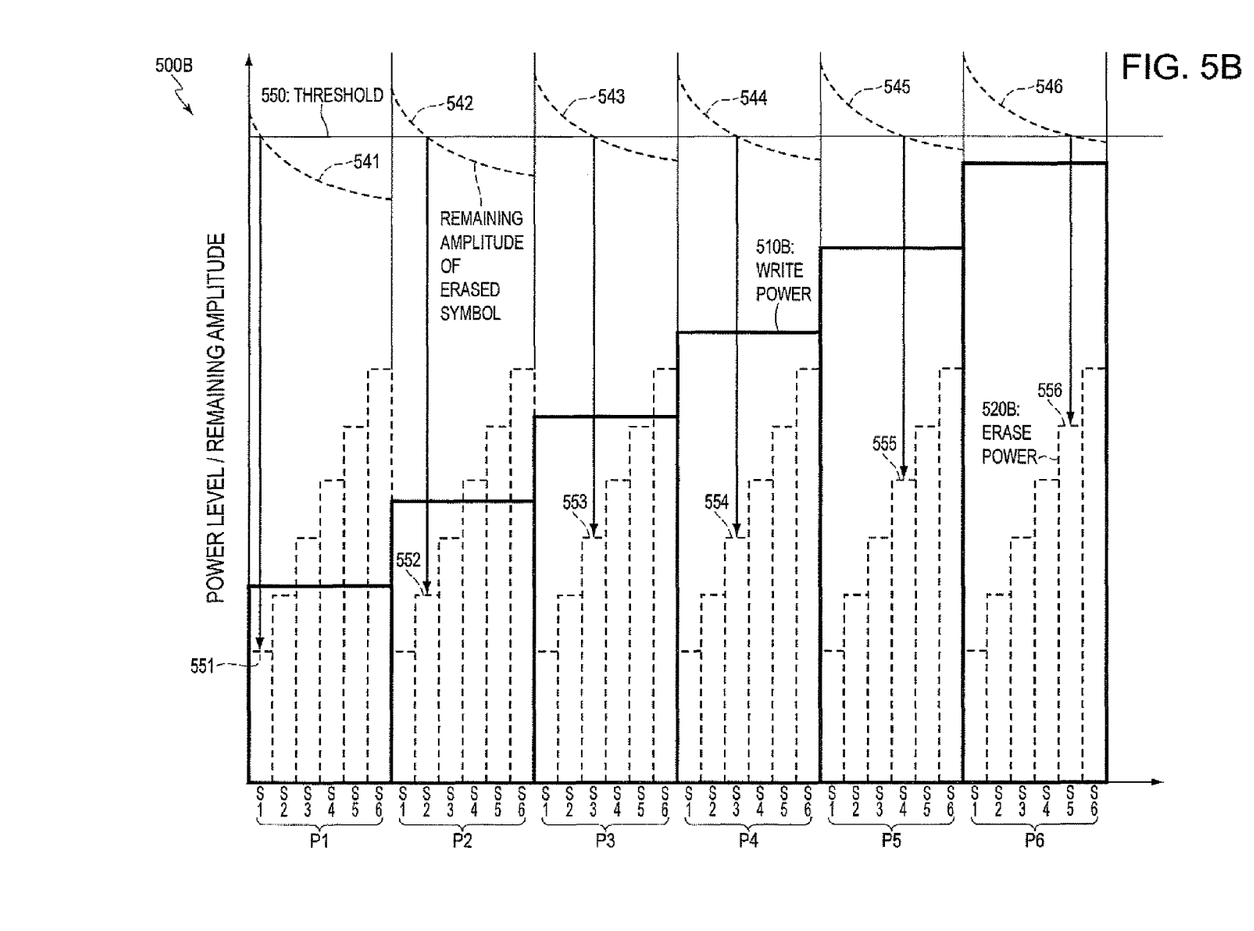
Figure 5C:
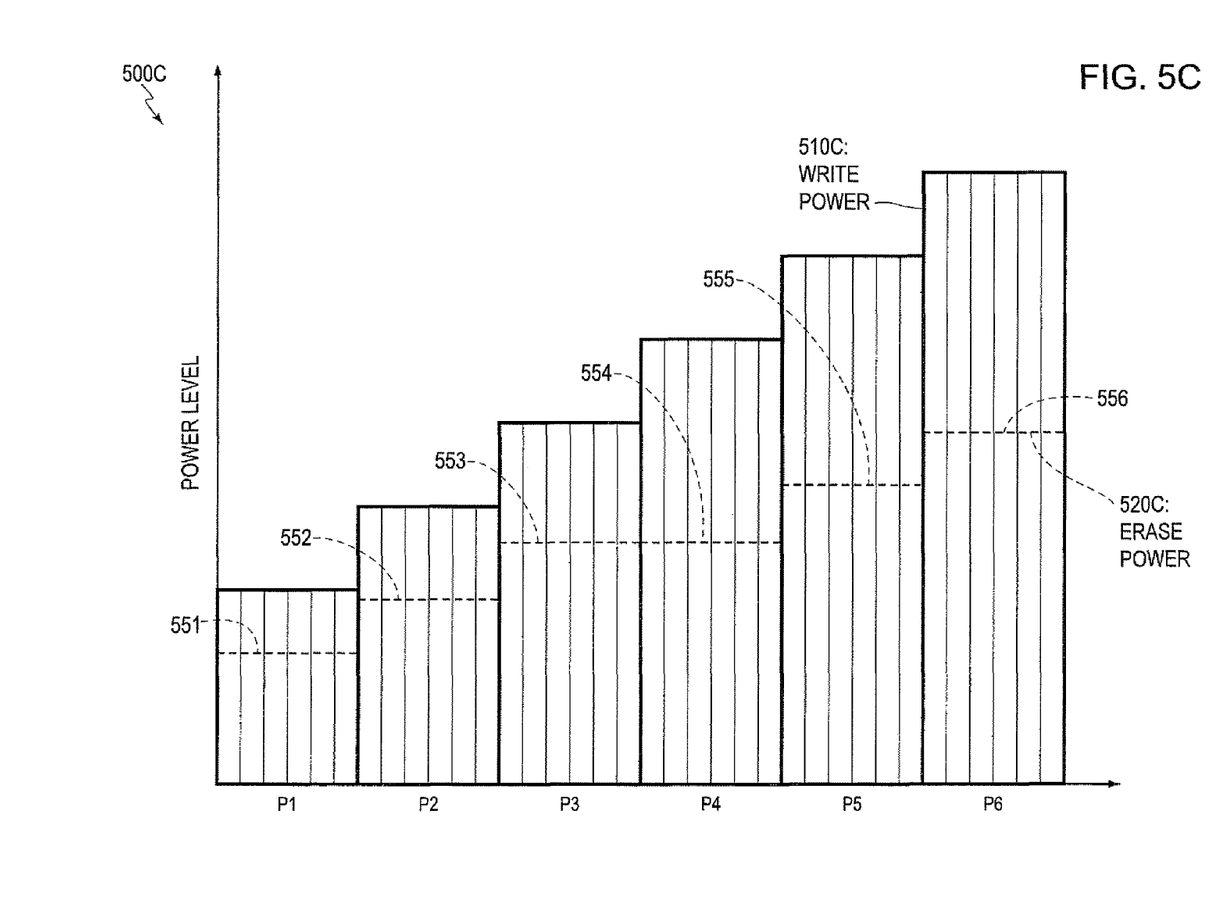

FIGS. 5A-5C show an example for an electronic system, such as the electronic system 100, to perform power calibration for a rewritable storage medium, such as the rewritable optical disc 105, according to an embodiment of the disclosure. In an example, the rewritable storage medium includes a recording track. The recording track includes a portion assigned for power calibration. In the FIGS. 5A-5C, the portion assigned for power calibration includes six power sections P1-P6 respectively corresponding to six write powers. Each of the power sections P1 to P6 includes six sub-sections S1-S6.

FIG. 5A shows power configurations for a first write stage of the power calibration.

In the first write stage, erase power is determined based on a constant ϵ (ratio between the erase power and the write power). For example, the constant ϵ is an initial ϵ read from the rewritable storage medium, or an initial ϵ stored in the electronic system. The electronic system writes a pattern in each of the sub-sections according to the erase power and the write power of the sub-sections. The pattern includes symbols of various widths, and spaced by various distances. It is noted that the pattern can be any suitable stream of symbols. The electronic system can write same pattern or different pattern in the sub-sections. In an example, the pattern includes a portion corresponding to pattern A (210A).

FIG. 5B shows power configurations for a second write stage.

In the second write stage, erase power is ramped up during each power section of P1 to P6. For example, S1 of a power section has the lowest erase power, and S6 of the power section has the highest erase power. The erase powers in each power section can include same power levels or can include different power levels. For clarity, the erase powers in each power section of FIG. 5B include same power levels. In the second write stage, the electronic system writes another pattern in each sub-section according to the erase power and the write power for the sub-section. The other pattern overwrites the pattern of the first write stage. It is noted that the other pattern leaves out some symbols in the pattern of the first write stage, and causes those symbols to be erased according to the power configuration for the sub-section. In an example, the pattern includes a portion corresponding to pattern B (210B) for over-writing the pattern A (210A).

After the second write stage, the electronic system reads back the rewritable storage medium, measures remaining amplitude of the erased symbols in each sub-section, and calculates, for example, an average remaining amplitude for each sub-section. In FIG. 5B, curves 541-546 show the average remaining amplitude of the erased symbols in the sub-sections.

Based on the remaining amplitudes, the electronic system determines a minimum erase power for each power section. In an example, the electronic system determines a minimum erase power for each power section, based on which remaining amplitude of the erased symbols is smaller than a threshold 550. For example, erase power 551 is determine for the power section P1; erase power 552 is determine for the power section P2; and so forth.

FIG. 5C shows power configurations for a third write stage.

In the third write stage, the electronic system writes patterns in each power section according to the write power of the power section, and the erase power determined for the power section. For example, the erase power 551 is used for the power section P1; the erase power 552 is used for the power section P2; and so forth.

After the third write stage, the electronic system reads back the rewritable storage medium, calculates jitters for each power section, and determines a power section with the smallest write power that the jitter of the power section is smaller than a jitter threshold. It is noted that the electronic system can use any suitable method to calculate jitter. In an example, the electronic system includes a phase locked loop to lock an internal signal to a signal read back from the rewritable storage medium in order to extract data from the signal. Then, jitter is calculated as a function of phase errors between the internal signal and the signal read back from the rewritable storage medium, as shown in Eq. 1

$$\text{Jitter} \propto \sqrt{\Sigma(\text{phaseerror})^2} \qquad \text{Eq. 1}$$

Figure 6:
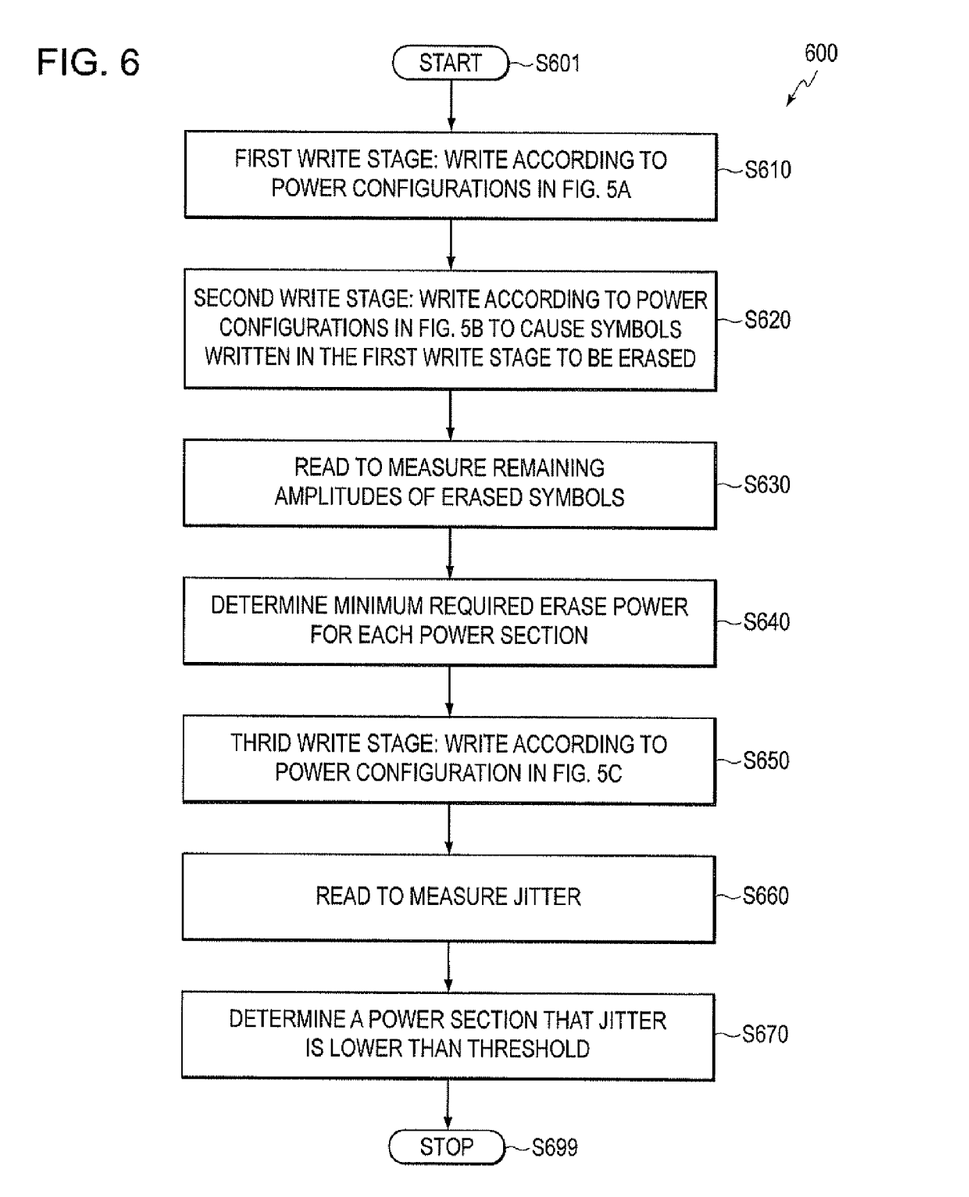
FIG. 6 shows a flow chart outlining a process example 600 for power calibration according to an embodiment of the disclosure.

FIG. 6 shows a flow chart outlining a process example 600 for power calibration according to the three write stages in FIGS. 5A-5C. The process is executed by an electronic system, such as the electronic system 100, to calibrate an optimum power configuration for recording on a rewritable storage medium. The process starts at S601, and proceeds to S610.

At S610, the electronic system is configured in the first write stage and writes patterns on the rewritable storage medium according the power configurations in FIG. 5A.

At S620, the electronic system is configured in the second write stage, and writes according to power configurations in FIG. 5B to cause some symbols written in the first write stage to be erased.

At S630, the electronic system reads back the rewritable storage medium to measure remaining amplitudes of the erased symbols.

At S640, the electronic system determines minimum erase power for each power section. In an example, the electronic system determines a minimum erase power for each power section, using which the remaining amplitude of the erased symbol is smaller than the threshold 550.

At S650, the electronic system is configured in the third write stage, and writes patterns on the rewritable storage medium according to the power configurations in FIG. 5C.

At S660, the electronic system reads back the rewritable storage medium, and calculates jitters for each power section.

At S670, the electronic system determines a power section with the smallest write power that the jitter of the power section is smaller than a jitter threshold. Then, the process proceeds to S699 and terminates.

While the subject matter of the present disclosure has been described in conjunction with the specific embodiments thereof that are proposed as examples, it is evident that many alternatives, modifications, and variations will be apparent to those skilled in the art. Accordingly, embodiments of the present disclosure as set forth herein are intended to be illustrative, not limiting. There are changes that may be made without departing from the scope of the present disclosure.

What is claimed is:

1. A method for power calibration, comprising:
   writing, using a power configuration, a second pattern over a first pattern on a rewritable storage medium, the first pattern including at least a first symbol and a second symbol and the second pattern not including the second symbol; and
   reading the rewritable storage medium to measure remaining amplitude of the second symbol in the first pattern.

2. The method of claim 1, further comprising:
   writing on the rewritable storage medium the first pattern.

3. The method of claim 2, wherein
   writing on the rewritable storage medium a plurality of the first patterns;
   writing, according to the power configuration, a plurality of the second patterns over the plurality of the first patterns on the rewritable storage medium;
   reading the rewritable storage medium to measure remaining amplitudes of the second symbols in the plurality of the first patterns written;
   averaging the remaining amplitudes; and
   associating the average with the power configuration.

4. The method of claim 1, wherein
   writing on the rewritable storage medium at least a first plurality of the first patterns and a second plurality of the first patterns;
   writing, according to a first power configuration, a first plurality of the second patterns over the first plurality of the first patterns on the rewritable storage medium;
   writing, according to a second power configuration, a second plurality of the second patterns over the second plurality of the first patterns on the rewritable storage medium; and
   reading the rewritable storage medium to measure first remaining amplitudes of the second symbols in the first plurality of the first patterns, and second remaining amplitudes of the second symbols in the second plurality of the first patterns.

5. The method of claim 4, further comprising:
   determining an optimum power configuration for the rewritable storage medium based on the first remaining amplitudes in association with the first power configuration and the second remaining amplitudes in association with the second power configuration.

6. The method of claim 1, wherein writing, according to the power configuration, the second pattern over the first pattern on the rewritable storage medium, further comprising:
   writing, according to a write power and an erase power, the second pattern over the first pattern on the rewritable storage medium.

7. The method of claim 1, wherein writing, according to the power configuration, the second pattern over the first pattern on the rewritable storage medium, further comprising:
   writing, according to a write power and a ratio of an erase power to the write power, the second pattern over the first pattern on the rewritable storage medium.

8. The method of claim 1, further comprising:
   storing a pattern that superimposes an instruction for measuring the remaining amplitude of the second symbol with one of the first pattern and the second pattern; and
   decoding the pattern to perform the instruction.

9. An apparatus, comprising:
   a read and write unit configured to:
      write, according to a power configuration, a second pattern over a first pattern on a rewritable storage medium, the first pattern including at least a first symbol and a second symbol and the second pattern not including the second symbol; and
      read the rewritable storage medium to measure a remaining amplitude of the second symbol in the first pattern; and
   a power calibration controller configured to determine an optimum power configuration for the rewritable storage medium based on the remaining amplitude in association with the power configuration.

10. The apparatus of claim 9, wherein the read and write unit is configured to write the first pattern on the rewritable storage medium and then write the second pattern over the first pattern.

11. The apparatus of claim 10, wherein
    the read and write unit is configured to:
       write on the rewritable storage medium a plurality of the first patterns;
       write, according to the power configuration, a plurality of the second patterns over the plurality of the first patterns; and
       read the rewritable storage medium to measure remaining amplitudes of the second symbols in the plurality of the first patterns; and
    the power calibration controller is configured to average the remaining amplitudes, and determine an optimum power configuration for the rewritable storage medium based on the averaged remaining amplitude in association with the power configuration.

12. The apparatus of claim 9, wherein
    the read and write unit is configured to:
       write on the rewritable storage medium at least a first plurality of the first patterns and a second plurality of the first patterns;
       write, according to a first power configuration, a first plurality of the second patterns over the first plurality of the first patterns on the rewritable storage medium;
       write, according to a second power configuration, a second plurality of the second patterns over the second plurality of the first patterns on the rewritable storage medium; and
       read the rewritable storage medium to measure first remaining amplitudes of the second symbols in the first plurality of the first patterns, and second remaining amplitudes of the second symbols in the second plurality of the first patterns; and
    the power calibration controller is configured to determine an optimum power configuration for the rewritable storage medium based on the first remaining amplitudes in association with the first power configuration and the second remaining amplitudes in association with the second power configuration.

13. The apparatus of claim 9, wherein
the read and write unit is configured to write, according to a write power and an erase power, the second pattern over the first pattern on the rewritable storage medium.

14. The apparatus of claim 9, wherein
the read and write unit is configured to write, according to a write power and a ratio of an erase power to the write power, the second pattern over the first pattern on the rewritable storage medium.

15. The apparatus of claim 9, further comprising:
a memory configured to store a pattern that superimposes an instruction for measuring the remaining amplitude of the second symbol with one of the first pattern and the second pattern.

16. A non-transitory computer readable medium storage program instructions for causing a processor to execute operations for power calibration, the operations comprising:
  writing, according to a power configuration, a second pattern over a first pattern on a rewritable storage medium, the first pattern including at least a first symbol and a second symbol and the second pattern not including the second symbol; and
  reading the rewritable storage medium to measure remaining amplitude of the second symbol in the first pattern.

17. The non-transitory computer readable medium of claim 16, wherein the operation comprises:
  writing on the rewritable storage medium the first pattern.

18. The non-transitory computer readable medium of claim 17, wherein the operations comprises:
  writing on the rewritable storage medium a plurality of the first patterns;
  writing, according to the power configuration, a plurality of the second patterns over the plurality of the first patterns on the rewritable storage medium;
  reading the rewritable storage medium to measure remaining amplitudes of the second symbols in the plurality of the first patterns;
  averaging the remaining amplitudes; and
  associating the average with the power configuration.

19. The non-transitory computer readable medium of claim 16, wherein the operations comprises:
  writing on the rewritable storage medium at least a first plurality of the first patterns and a second plurality of the first patterns;
  writing, according to a first power configuration, a first plurality of the second patterns over the first plurality of the first patterns on the rewritable storage medium;
  writing, according to a second power configuration, a second plurality of the second patterns over the second plurality of the first patterns on the rewritable storage medium; and
  reading the rewritable storage medium to measure first remaining amplitudes of the second symbols in the first plurality of the first patterns, and second remaining amplitudes of the second symbols in the second plurality of the first patterns.

20. The non-transitory computer readable medium of claim 19, wherein the operations comprises:
  determining an optimum power configuration for the rewritable storage medium based on the first remaining amplitudes in association with the first power configuration and the second remaining amplitudes in association with the second power configuration.

\* \* \* \* \*